Dec. 16, 1930.  E. G. DUDEN  1,784,893
WATER TREATING APPARATUS
Filed Aug. 29, 1928  4 Sheets-Sheet 2

INVENTOR.
Emil G. Duden
BY Green & McCallister
His ATTORNEYS.

Dec. 16, 1930.  E. G. DUDEN  1,784,893
WATER TREATING APPARATUS
Filed Aug. 29, 1928    4 Sheets-Sheet 3

INVENTOR.
Emil G. Duden
BY Green & McCallister
His ATTORNEYS.

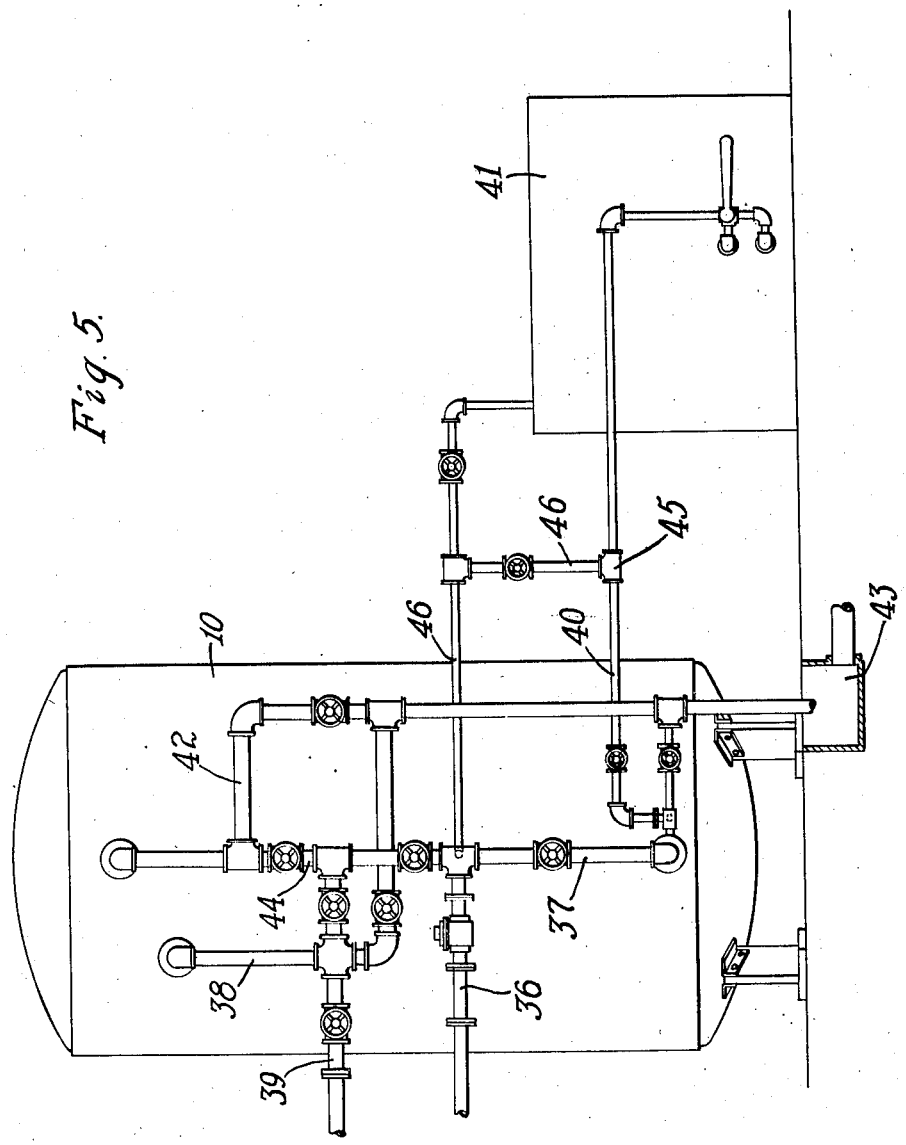

Patented Dec. 16, 1930

1,784,893

UNITED STATES PATENT OFFICE

EMIL G. DUDEN, OF OAKMONT, PENNSYLVANIA, ASSIGNOR TO WM. B. SCAIFE & SONS COMPANY, A CORPORATION OF PENNSYLVANIA

WATER-TREATING APPARATUS

Application filed August 29, 1928. Serial No. 302,661.

This invention relates to water treatment and more particularly to an improved method of and apparatus for softening water.

Water softeners generally consist of a casing provided with a bed of softening material and having suitable pipe connections to permit the introduction of hard water at one end and the withdrawal of treated or softened water at the other end. In the so-called downflow softeners the water is introduced into the top of the container or casing above the bed of softening material and is withdrawn through a suitable manifold and piping connections located adjacent the bottom of the container below such bed, the water passing through the intermediate bed of softening or other treating material in a downward direction.

In the type of softener known as upflow type, the water is introduced into the casing through the lower manifold adjacent the bottom thereof and below the bed of mineral or other reagent material, through which the water flows upwardly to be drawn off near the top of the casing through suitable connections.

It will be apparent that, in order to obtain a high exchange value upon the flow of water through the mineral bed, it is necessary to utilize all parts of the bed by causing a substantially even flow of water through the entire bed. A great objection to the upflow type of softener, heretofore, has been the practical impossibility of obtaining an even flow of water through the entire bed, especially during relatively low rates of flow. This is due to the fact that channeling takes place, as a result of which the water flows through the bed in concentrated streams which follow more or less regular paths or channels, instead of spreading out and flowing equally through the entire bed of mineral.

An object of this invention is to provide a method of and apparatus for softening water which will provide a relatively high exchange value in an upflow softener even at a relatively low rate of flow.

A further object is to provide a water softening apparatus constructed and arranged to provide a high exchange value at any rate of flow.

A still further object is to provide a water softening apparatus of the type set forth which will be simple and rugged in construction and relatively cheap to manufacture and assemble.

Figure 1:
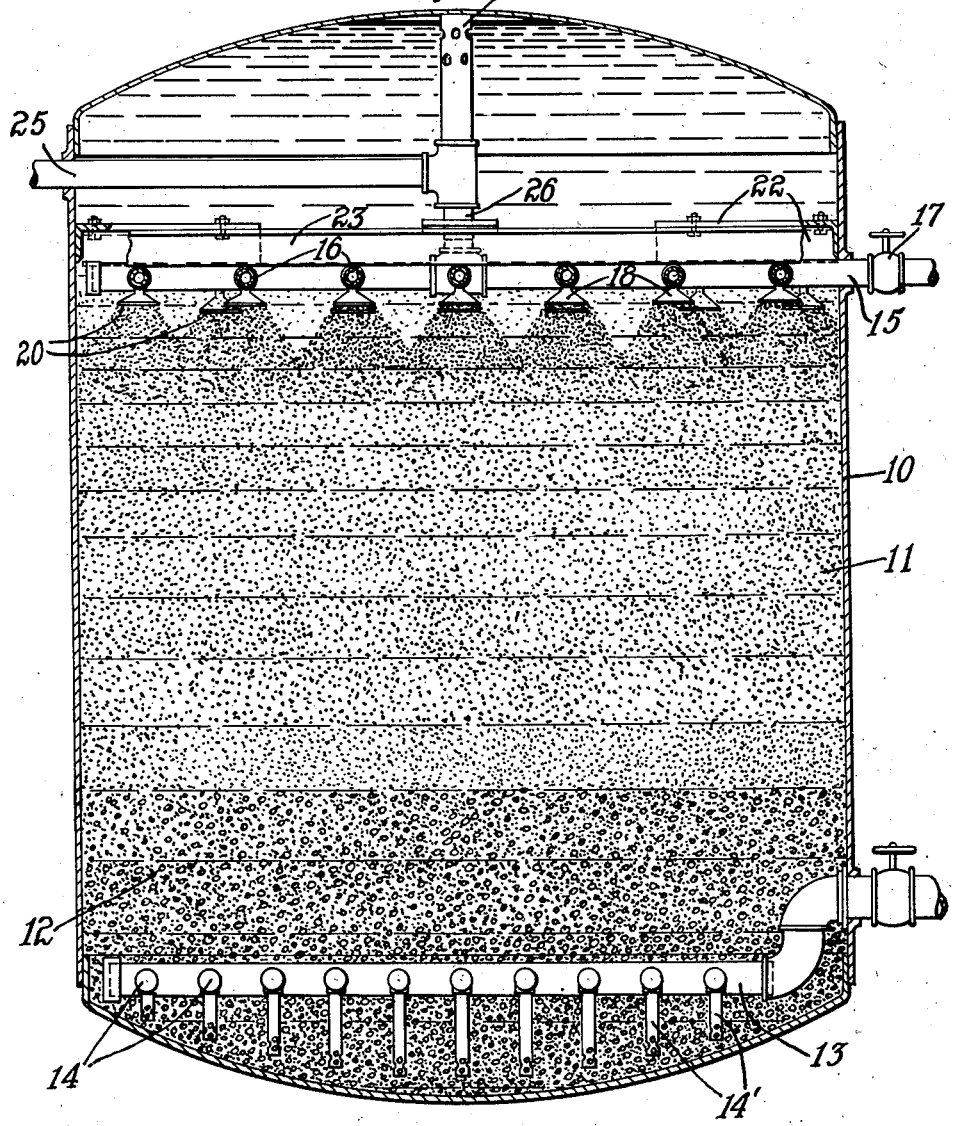
Figure 2:
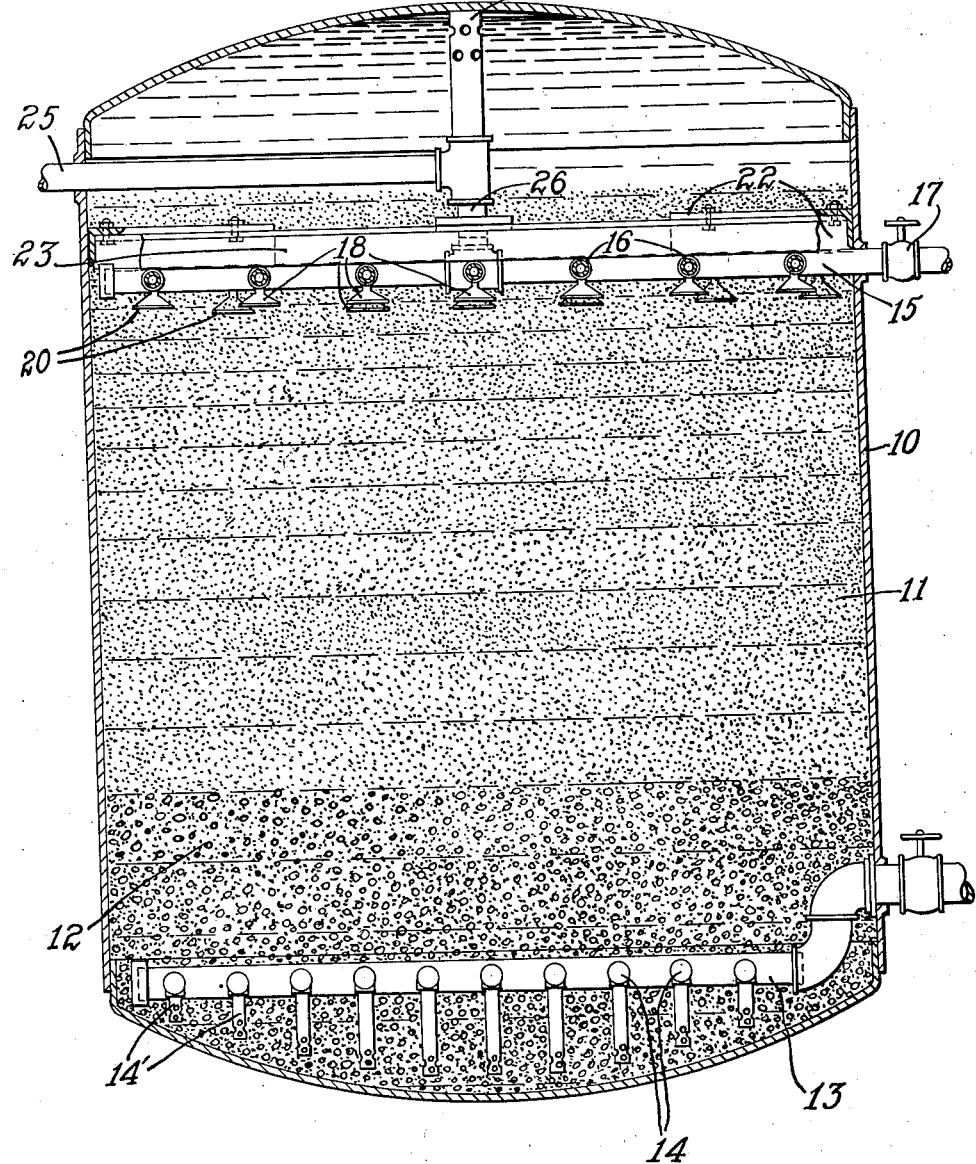
Figure 3:
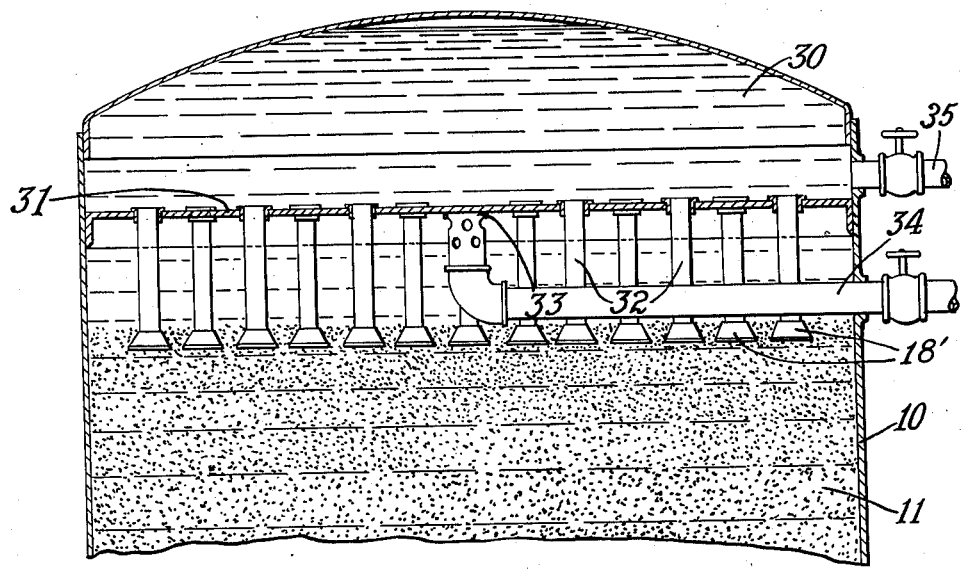
Figure 4:
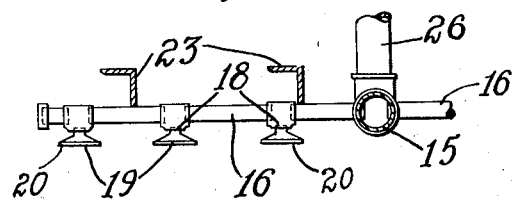

These and other objects which will be apparent to those skilled in this particular art are accomplished by means of the invention illustrated in the accompanying drawings in which Figure 1 is a vertical sectional view through a water softener constructed in accordance with one embodiment of this invention and exemplifying one manner of performing my improved method. Fig. 2 is a similar view illustrating a different operation of the apparatus shown in Fig. 1. Fig. 3 is a partial view, similar to Fig. 1, of a somewhat modified form of apparatus. Fig. 4 illustrates certain details of construction and Fig. 5 shows various piping connections.

I have found that the uneven flow of water through a mineral bed, or the like, which occurs, for example, in a water softener when the water flows through such bed in an upward direction at a relatively low rate such, for example, as less than four gallons per square foot per minute, is due to the fact that under such conditions, the bed of treating material expands unevenly, with the result that the resistance to flow through certain parts of such bed is materially less than the resistance to flow through adjacent portions of said bed. As a direct result of the low rates of flow in an upflow softener, the water naturally tends to follow the lines of least resistance with the result that channeling takes place. That is to say, the water flows through the bed in certain well defined streams and bubbles out of the top of such bed in a springlike manner. Obviously, the relatively small amount of softening or other treating material along such lines of flow is called upon to carry out the softening of practically the entire amount of water passing through the bed while the material in other portions of the bed remains inactive, with the result that the exchange value of the whole is very low. In order to overcome this objection and to render upflow softeners, or the like, efficient at relatively low rates of water flow, I control the expansion of the bed of reagent or mineral material in such a way as to maintain a substantially equal resistance to water flow throughout the entire bed at substantially all rates of water flow therethrough. By controlling the bed so as to produce a uniform resistance to flow through all parts thereof, the water will flow in substantially equal volume through the entire bed area, so that "channeling" is eliminated and the efficient operation of an upflow softener is possible at any desired rate of water flow.

The accompanying drawings illustrate one form of apparatus capable of being used successfully in the commercial exploitation of this invention, but it will be apparent that various other forms of mechanism are capable of successful employment in carrying out the present invention.

The particular apparatus which has been chosen for the purposes of illustration is shown in the form of a pressure cylinder 10 or the like, which forms a reagent or softening chamber and which has provided therein a bed 11 of water treating material which overlies a supporting bed 12 of sand, gravel or other material capable of suitably supporting the mineral bed, and at the same time, permitting a regular uniform flow of water therethrough. An inlet manifold, formed by a main header 13 and a plurality of lateral connecting headers 14, is located adjacent the bottom of the shell 10 and embedded within the gravel bed. Downwardly extending nozzles 14' are provided on the headers and extend to points adjacent the shell bottom for the even distribution of water throughout the adjacent portions of the casing during operation of the apparatus.

An outlet manifold is located in the upper portion of the shell and is formed by a collecting header 15 having laterally extending headers 16 communicating therewith and suitably connected through a valve 17 with the outside piping. The collecting header 15 and the different communicating, lateral headers 16 have sets of offtake nozzles 18 with enlarged or flaring mouths 19 forming offtake openings or outlets for the softened water. The collecting nozzles or offtakes are located a slight distance below the top level of the bed 11 when the apparatus is not in operation, that is to say, when no water is passing therethrough. The relatively large mouth of each offtake nozzle is covered by a metal plate 20 having a large number of cylindrical openings of such size as to prevent the passage into the nozzles of any of the water softening or mineral material.

Diametrically opposed arcuate angles 22 are secured to the wall of the casing above the offtake header and other angles 23 extend across the top surfaces of the various lateral headers 16 and are secured at their opposite ends to the arcuate supporting angles 22. An additional offtake is provided at the top of the casing by a perforated offtake pipe 24 extending vertically downward from the top and communicating with an outlet pipe 25 extending outwardly through the casing wall. A bracing strut 26 is interposed between the offtake pipe 24 and the main outlet header 15 for the purpose of bracing the latter against upward pressure and transmitting such pressure from the header to the top of the container, but there is no communication between these two outlet pipes within the shell.

In operation, assuming the rate of water flow through the softener to be relatively low, the delivery of water to the softener through the inlet manifold, 13, 14 and 14', distributes such water substantially evenly throughout the gravel bed adjacent the bottom of the shell, the water rising through the gravel bed and the superimposed bed 11 of softening agent, to be drawn off through the offtakes above such bed. The admission of water to the softener and the mineral bed 11 tends to cause the latter to expand. If the bed were left free to expand, it would do so unevenly and the objectionable channeling heretofore prevalent in upflow softeners would take place. However, with an arrangement such as that described, the upward flow of water towards the nozzles 18 causes the mineral crystals or particles of softening material to be pressed against the metallic plate screens which cover the mouths of such nozzles, with the result that areas of compression are formed by the upward pressure of the water rising through the bed beneath each of the offtake nozzles 18, and these compression areas appear to assume the more or less conical form indicated in Figure 1. The nozzles are so positioned in the bed and each nozzle is so spaced with relation to the adjacent nozzles that substantially the entire upper area of the mineral bed is affected by these areas of compression, with the direct result that expansion of the mineral bed as a result of the upflow of water is substantially prevented, or is so controlled as to eliminate the objectionable features resulting from an uneven expansion thereof. Accordingly, the water flows upwardly through all parts of the bed at substantially equal rates, due to the fact that the resistance to flow through one portion of the bed is substantially the same as the resistance to flow through other portions thereof. In other words, by controlling the expansion of the mineral bed so as to prevent channeling of the water therethrough, all portions of the bed are brought into contact with substantially equal amounts of water and the desired high exchange value is thereby obtained. The bracing angles 22 and 23 together with the bracing strut 26 and outlet pipe 24 reinforce the outlet manifolds 15 and 16, as above described, so as to prevent buckling or breaking thereof by the upward pressure caused by the rising water.

At high rates of flow it is not necessary to control or limit the expansion of the mineral bed, for the reason that at such high rates of water flow the force of the water is sufficient to cause a practically even flow through all portions of the bed, resulting in substantially equal expansion in all parts thereof. Under such conditions of operation the softened water is withdrawn through the offtake 24 located adjacent the upper end of the softener shell. The fact that there is no flow of water into the outlet nozzles 18 eliminates the presence of the compact areas shown in Fig. 1 and the bed is free to expand in more or less the manner indicated in Fig. 2 under the influence of the relatively high rate of upflow.

It will be readily apparent to those skilled in this art that the present invention is capable of being carried out in many different ways by different forms of apparatus. For example, Fig. 3 illustrates the upper end of a water softener of substantially different construction and arrangement from that illustrated in the other figures. In this modification a collecting chamber 30 is formed by a partition plate 31 to which are connected and through which extend a plurality of outlet pipes 32 extending downwardly to such a position that the associated outlet nozzles 18' are, like the previously described outlet nozzles, located below the upper surface of the bed 11 of mineral material or softening agent. A perforated outlet pipe 33 is located just beneath the partition 31 and communicates with a valve controlled outlet pipe 34, for use during high rates of flow and in salt washing. A valve controlled outlet pipe 35 is provided for removing softened water from the outlet chamber 30. The lower portion of the softener is similar to that already described.

Fig. 5 illustrates one manner of connecting the various manifolds and the like for the operation of an upflow softener constructed, for example, in the manner described in connection with Figs. 1 and 2. A supply line 36 for raw water is connected through a valve controlled pipe 37 with the inlet manifold 13 adjacent the bottom of the softener for introducing raw water thereto. The outlet manifold 15 communicates with a pipe 38 leading to a valve controlled line 39 for conveying the softened or otherwise treated water to the desired point of consumption or storage. In regenerating the exhausted mineral by passing a salt solution through the bed, as well known in the art, a charge of salt or strong brine may be admitted to the inlet manifold 13 through a valve controlled pipe 40 connecting such manifold with a suitable source 41 of brine. The brine may be drawn into the line 40 by the action of an injector 45 operated by the flow of water from the supply line 36 to line 40 through a valve controlled connecting line 46. When sufficient brine has been introduced into the softener, the line 40 is closed and fresh water delivered to the bottom of the shell through supply line 37 for thoroughly washing out the residue of the salt solution from the interior of the softener. The salt wash is preferably drawn off through the screen connections or nozzles 18 so as to prevent expansion of the bed, thus retarding the flow of salt wash through the bed and obtaining a sufficient time of contact between the salt and the bed for the desired reaction. Taking off the salt wash through the nozzles also insures an even penetration of the bed by the wash even at low rates of flow. The finish wash of fresh water may be taken off through either outlet line 15 or 25, or both. It will, of course, be understood that suitable piping 44 is provided for connecting the outlet 24 with the delivery line 39 for softened water, to permit the use of the offtake 24 during operation of the softener at relatively high rates of flow.

It will be apparent that proper control of the expansion of the bed insures an even distribution of water throughout the entire bed even at low rates of flow. At the same time the arrangement is such that an expansion space is provided above the bed so as to permit the free expansion thereof during periods of high rates of flow or during certain wash periods. As a result, a successful upflow softener arranged to employ upflow regeneration is provided.

Although I have described in more or less detail a specific manner of carrying out my invention, together with more or less specific apparatus embodying novel features of my invention, it will be apparent that various changes, modifications, additions, substitutions and omissions can be made therein without departing from the spirit of my invention or the scope of the appended claims.

What I claim as new and desire to secure by Letters Patent is:

1. A water softening apparatus including a casing provided with a bed of water softening material, means for causing water to be softened to flow upwardly through said bed, vertically disposed offtakes for softened water located beneath the surface of said bed so as to cause said water flow to form areas of compression in said bed to prevent the free expansion thereof, offtakes located above said bed in spaced relation thereto, and means for removing water through either or both of said offtakes.

2. A water softening apparatus including a casing provided with a bed of water softening material, means for causing water to be softened to flow upwardly through said bed, vertically disposed offtakes for softened water located beneath the surface of said bed so as to cause said water flow to form areas of compression in said bed to prevent the free expansion thereof, offtakes located above said bed in spaced relation thereto, means for introducing a regenerating solution to the bottom of said bed and means for removing the wash through either or both of said offtakes.

In testimony whereof, I have hereunto subscribed my name this 24th day of August, 1928.

EMIL G. DUDEN.